R. WRLLA.
TUMBLER AND STEIN WASHER.
APPLICATION FILED SEPT. 17, 1915.

1,234,247.

Patented July 24, 1917.
5 SHEETS—SHEET 1.

WITNESSES
Emil E. Hallenberg
Paul A. Niersen

INVENTOR
R. Wrlla
By H. J. Sanders
Atty.

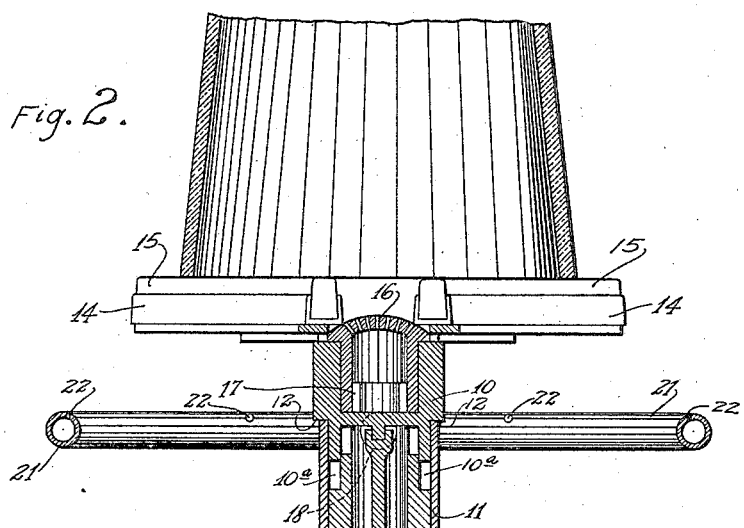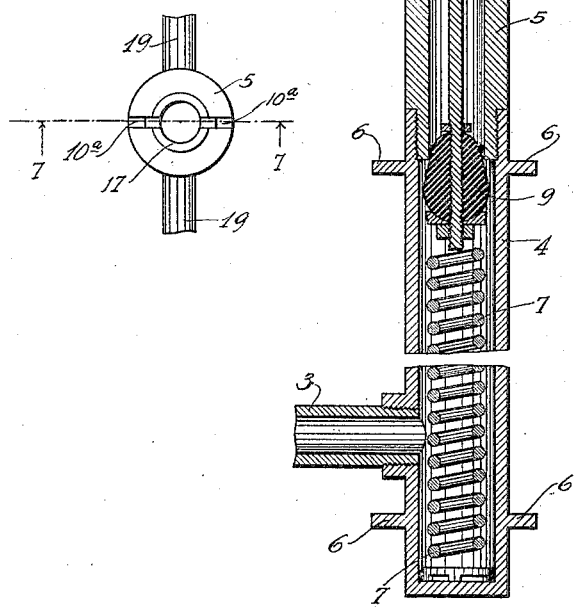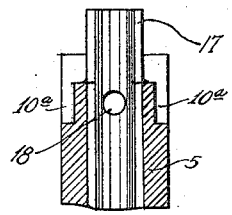

R. WRLLA.
TUMBLER AND STEIN WASHER.
APPLICATION FILED SEPT. 17, 1915.
1,234,247.
Patented July 24, 1917.
5 SHEETS—SHEET 3.
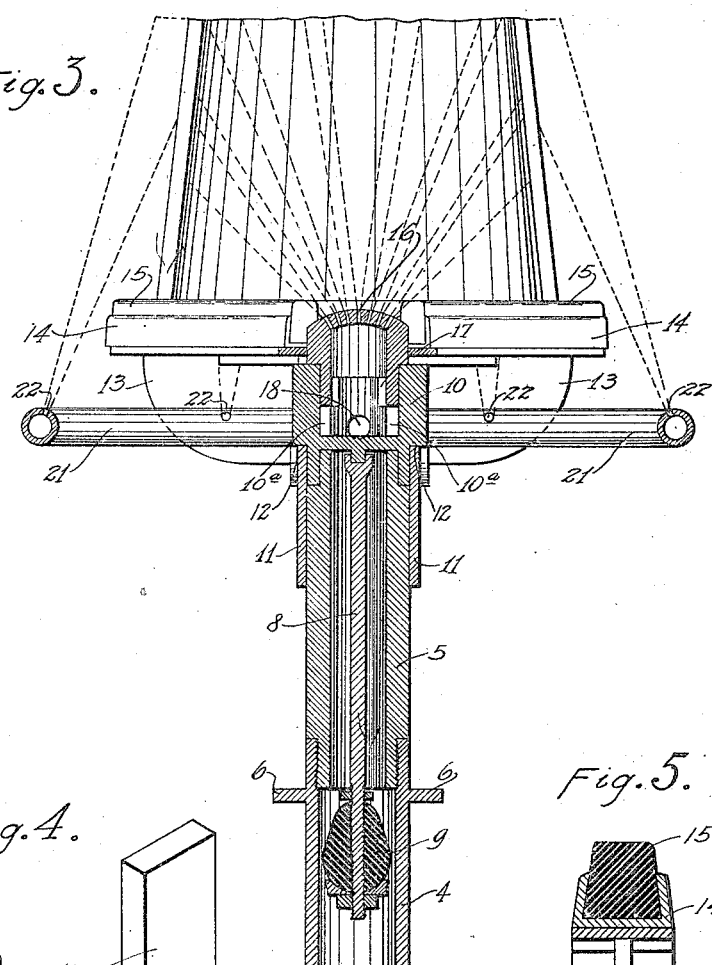
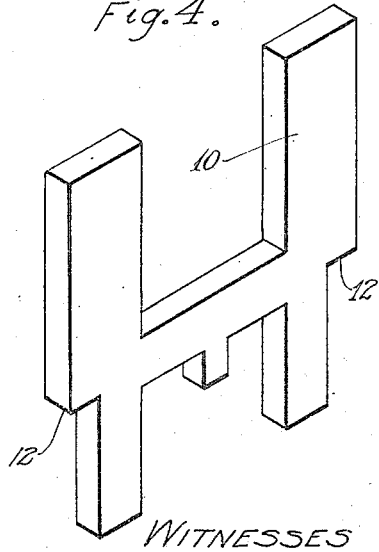
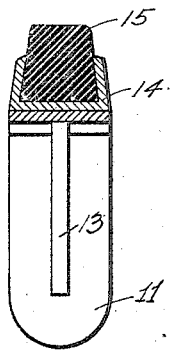
WITNESSES
Emil E. Hallenberg
Paul A. Niesen
INVENTOR
R. Wrlla
By H. J. Sanders
Atty.

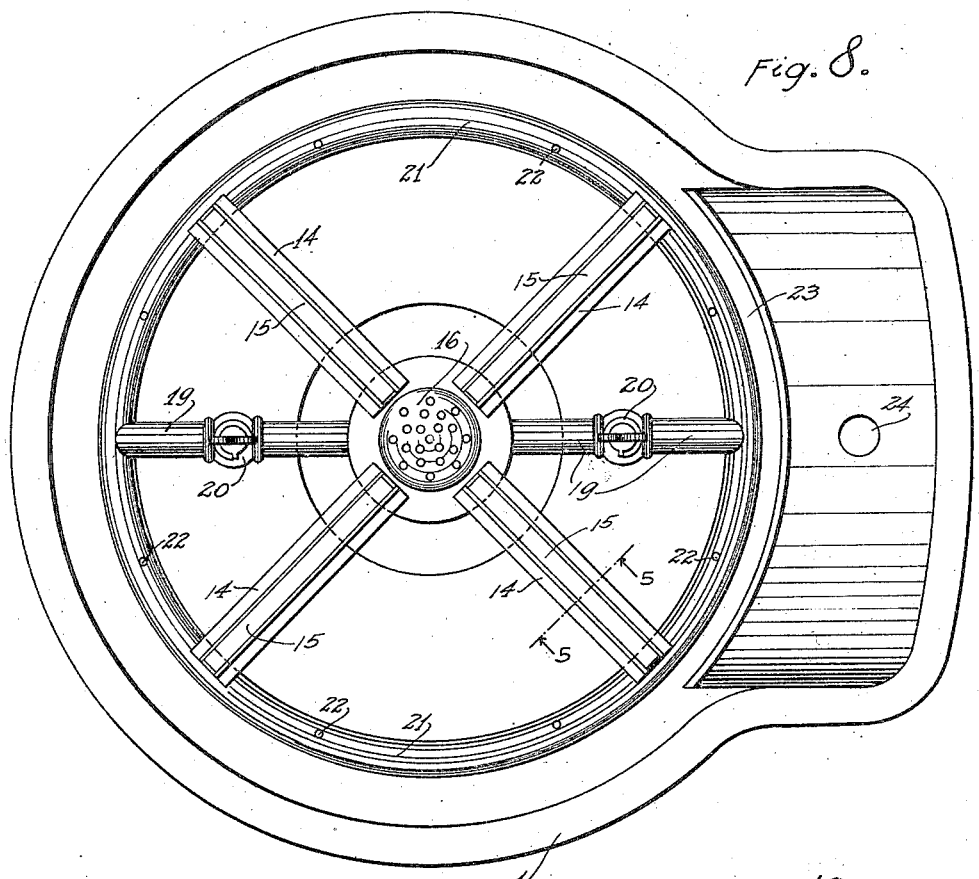
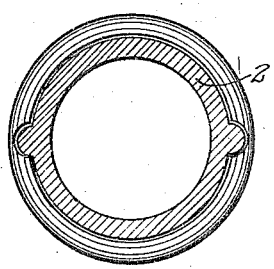
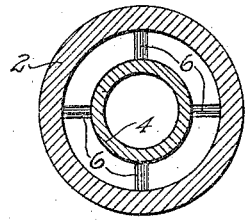

R. WRLLA.
TUMBLER AND STEIN WASHER.
APPLICATION FILED SEPT. 17, 1915.
1,234,247.
Patented July 24, 1917.
5 SHEETS—SHEET 5.
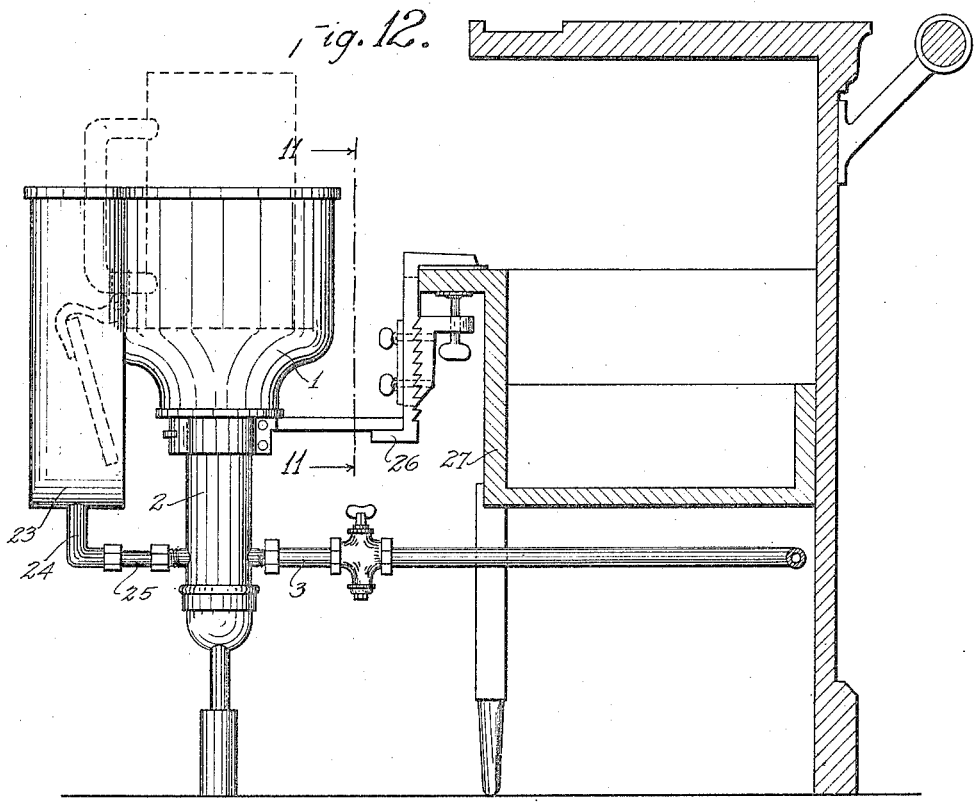
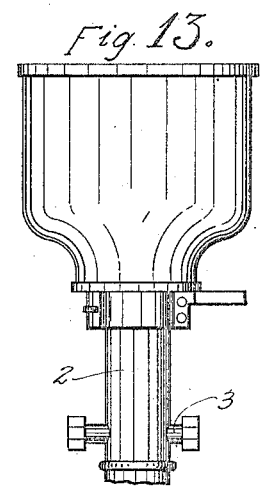
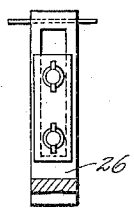
WITNESSES
Emil E. Hallenberg
Paul A. Niesen
INVENTOR
R. Wrlla
By H. J. Sanders
Att.

UNITED STATES PATENT OFFICE.

RUDOLPH WRLLA, OF CHICAGO, ILLINOIS, ASSIGNOR OF ONE-HALF TO ANTON CHELLAR, OF CHICAGO, ILLINOIS.

TUMBLER AND STEIN WASHER.

1,234,247.     Specification of Letters Patent.     Patented July 24, 1917.

Application filed September 17, 1915. Serial No. 51,247.

*To all whom it may concern:*

Be it known that I, RUDOLPH WRLLA, a citizen of the United States, residing at Chicago, in the county of Cook and State of Illinois, have invented certain new and useful Improvements in Tumbler and Stein Washers, of which the following is a specification.

This invention relates to improvements in tumbler and stein washers and more particularly to devices of that class wherein the article to be washed is held mouth down in the washer and then depressed in order to turn on the water. An object of the invention is to provide a chamber to receive and wash the cover of a stein while the body of the same is being washed. With the foregoing and other objects in view the invention consists in the arrangement of parts to be hereinafter fully described in the following specification, pointed out in the appended claims and illustrated in the accompanying drawings which form a part of said specification and in which—

Fig. 2 is a vertical sectional view through the supply pipe, the tumbler receiving member being shown in elevation and the tumbler in section.

Fig. 3 is a view similar to Fig. 2 but with the tumbler receiver depressed and the water turned on.

Fig. 4 is an enlarged perspective view of the key employed.

Fig. 5 is a section taken on line 5—5 of Fig. 8.

Fig. 6 is a plan view of the supply pipe with the cap and key removed.

Fig. 7 is a vertical sectional view of Fig. 6 on line 7—7 of that figure.

Fig. 8 is a top plan view of the invention.

Fig. 9 is a cross section taken on line 9—9 of Fig. 1.

Fig. 10 is a similar view taken on line 10—10 of Fig. 1.

Fig. 11 is a front view of the holding bracket taken on line 11—11 of Fig. 12.

Fig. 12 is a side elevation of the invention showing its application.

Fig. 13 is a slightly modified form in side elevation.

Figure 1:
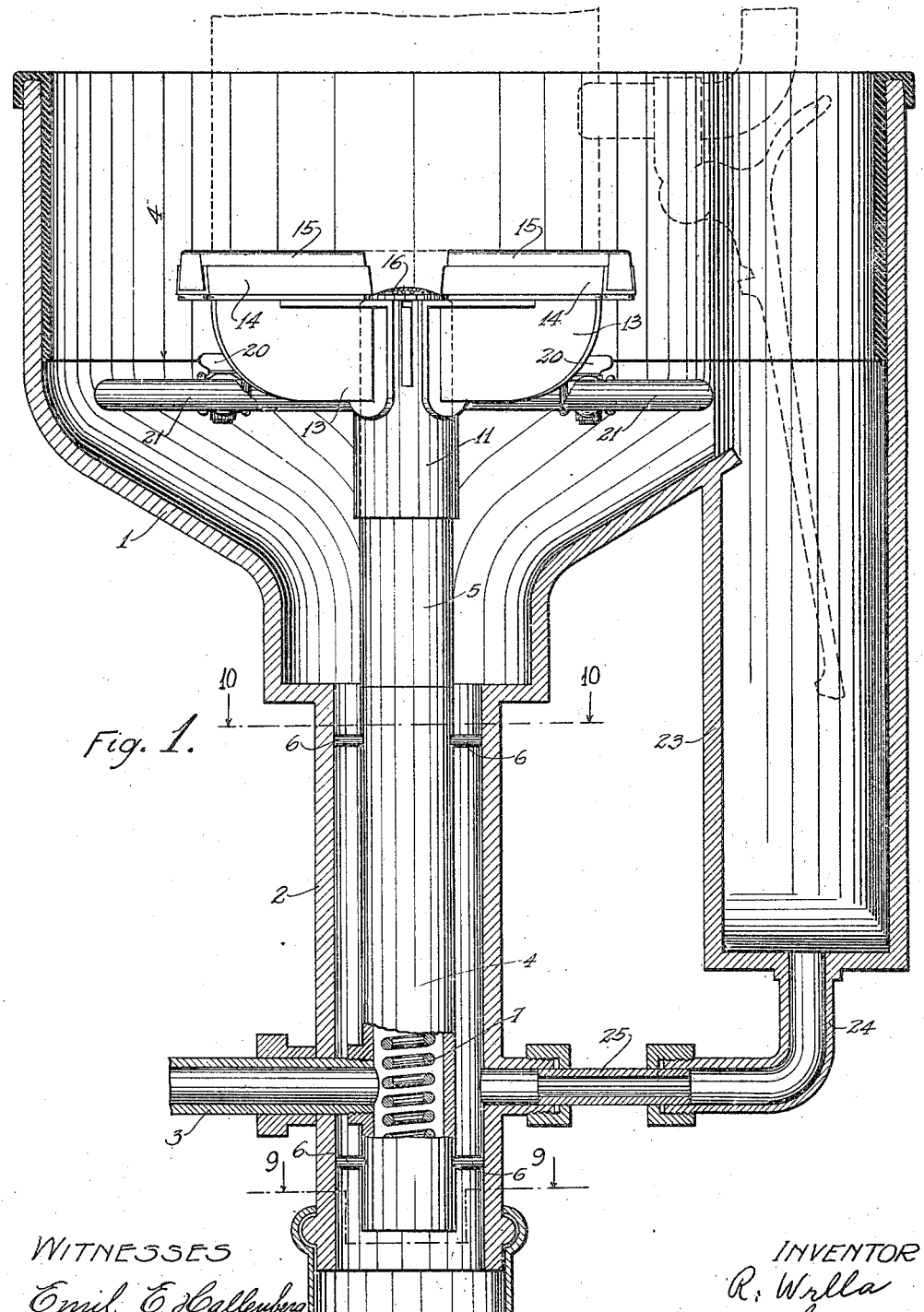
Figure 1 is a vertical sectional view through my improved tumbler and stein washer.

Like reference characters indicate corresponding parts throughout the several views, My improved tumbler and stein washer comprises a drain bowl 1 having a drain stem 2 through which a water supply pipe 3 extends into a delivery pipe comprising the threaded sections 4, 5 the former of which is provided with lugs 6 whereby it is spaced away from the stem 2; the section 4 being closed at its lower end and provided with the coil spring 7 upon which the lower end of a plunger 8 rests which is provided with the rubber head 9 which in normal position is pressed against the lower and inner end of the pipe section 5 to prevent the flow of water thereinto from the section 4. The upper end of the plunger 8 is recessed to form a bearing for the key 10 which is formed with two sets of prongs, one of said sets being adapted to fit snugly into oppositely disposed grooves 10$^a$ formed in the pipe section 5 and the other set of key-prongs being disposed in the bifurcated end of the said pipe section and formed with shoulders 12 that rest upon a sleeve 11 slidably fitted to the pipe section 5 and carried by the wings 13 of the tumbler table 14 which is channeled and fitted with rubber bars 15 that directly receive the rim of the tumbler or washer under operation. The center of the table 14 is perforated to receive the head of the nozzle 16 which guides the key 10 and snugly encircles and embraces the reduced end 17 of the pipe section 5.

The pipe section 5, further, is formed with oppositely disposed threaded openings 18 into which water pipes 19 are fitted that are provided with valves 20 and that connect with the circular water ring 21 formed with perforations 22 so arranged as to spray water under pressure upward and toward the center of the ring. The preferred form of bowl 1 is formed with an integral chamber 23 which opens into said bowl and which is connected by a suitable drain pipe 24 and adjustable coupling 25 with the stem 2. When the device is used to wash steins the body of the stein is inverted upon the bars 15 and the open stein-top disposed in the chamber 23 where it is washed by the spray, overflow and surplus water from the bowl 1.

When the glass or stein is in position to be washed it is manually depressed thereby depressing the table 14, thus forcing the rubber head 9 out of engagement with the lower end of the pipe section 5 and permitting the upward flow of water through the pipe 4, 5 and through the nozzle 16 and through the pipe 19 into the ring 21 from which, as well as from the nozzle, the water is played upon the glass or stein and some of it finds its way into the chamber 23 to wash the stein cover. In Fig. 13 a modified form of bowl is shown in which the stein-top-receiving chamber is dispensed with. By means of the adjustable bracket 26 the device may be attached to a bar 27 or other support.

What is claimed is:—

1. In a tumbler and stein washer, a drain bowl provided with a stem, a sectional water delivery pipe arranged in said stem and bowl, one of said pipe sections having one of its ends reduced and fitted into the second pipe section and its opposite end grooved and reduced in diameter, the second section of said pipe being closed at one end and formed about its outer periphery with spacer lugs, a plunger rod grooved in its upper end and extending through one section of said delivery pipe and into the second section, a valve carried by said plunger rod within the second pipe section for normal engagement with one end of the other pipe section to close the same, means within said second pipe section engaging said valve for yieldingly retaining the same in normal position; a key formed with prongs for engagement with the grooved end of said sectional pipe and for engagement with the grooved end of said plunger rod, a nozzle engaging said key and the adjacent end of said delivery pipe, a circular water spray pipe operatively connected to said delivery pipe below said nozzle, a tumbler table slidably connected to said delivery pipe and disposed above said nozzle and above the plane of said circular water spray pipe and tumbler receiving bars carried by said tumbler table.

2. In a tumbler and stein washer, a drain bowl provided with a stem, a water delivery pipe arranged within said stem, lugs carried by said pipe for spacing the same away from the wall of said stem, a circular water spray pipe operatively connected to said delivery pipe within said drain bowl, a nozzle for said delivery pipe above the plane of said circular spray pipe, a channeled tumbler table slidably connected to said delivery pipe and disposed above said nozzle and circular spray pipe, tumbler receiving bars removably disposed in the channeled portions of said tumbler table, a stein-top-receiving member formed integral with said drain bowl and opening into the same below the plane of said nozzle and circular spray pipe and a liquid passageway connecting said stein-top-receiving member and the stem of said drain bowl.

In testimony that I claim the foregoing as my own I have hereto affixed my signature in the presence of two subscribing witnesses.

RUDOLPH WRLLA.

Witnesses:
 VINCENZ DITĚ,
 JOE ZACH.

Copies of this patent may be obtained for five cents each, by addressing the "Commissioner of Patents, Washington, D. C."